(12) United States Patent
Yamaoka et al.

(10) Patent No.: US 10,186,977 B2
(45) Date of Patent: Jan. 22, 2019

(54) RESONANT POWER CONVERTER

(71) Applicant: Panasonic Intellectual Property Management Co., Ltd., Osaka (JP)

(72) Inventors: Masahiro Yamaoka, Osaka (JP); Takehiko Yamakawa, Osaka (JP); Motohiko Fujimura, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/982,605

(22) Filed: May 17, 2018

(65) Prior Publication Data

US 2018/0269796 A1 Sep. 20, 2018

Related U.S. Application Data

(63) Continuation-in-part of application No. 15/016,374, filed on Feb. 5, 2016, now abandoned.

(30) Foreign Application Priority Data

Mar. 2, 2015 (JP) .................................. 2015-039748

(51) Int. Cl.
*H02M 7/48* (2007.01)
*H02M 3/335* (2006.01)
(Continued)

(52) U.S. Cl.
CPC ....... *H02M 3/33592* (2013.01); *H02M 3/337* (2013.01); *H02M 1/00* (2013.01);
(Continued)

(58) Field of Classification Search
CPC .......... H02M 3/33569; H02M 3/3376; H02M 2001/0054; H02M 3/3353;
(Continued)

(56) References Cited

U.S. PATENT DOCUMENTS 5,459,650 A 10/1995 Noro
5,684,683 A 11/1997 Divan et al.
(Continued)

FOREIGN PATENT DOCUMENTS

JP 2010-004724 A 1/2010
JP 2012-129502 A 7/2012
(Continued)

OTHER PUBLICATIONS

Non-Final Office Action issued in U.S. Appl. No. 15/016,374, dated Dec. 1, 2016.
(Continued)

*Primary Examiner* — Alex Torres-Rivera
(74) *Attorney, Agent, or Firm* — McDermott Will & Emery LLP

(57) ABSTRACT

An electric power conversion device includes: a transformer including first and second windings magnetically coupled; a bridge circuit including a switch element; a rectifier circuit coupled to an output side of the transformer; a first resonant inductor; a second resonant inductor external to the transformer; and a resonant capacitor, wherein n1≥n2, Cr>C1, and Lr>L2 where Lr is an inductance value of the first resonant inductor and L2 is an inductance value including an inductance value of the second resonant inductor and an inductance value of a parasitic inductance component that is in series with the second winding in the pathway from the second winding to the rectifier circuit.

2 Claims, 6 Drawing Sheets

(51) Int. Cl.
*H02M 3/337* (2006.01)
*H02M 1/00* (2006.01)

(52) U.S. Cl.
CPC ............... *H02M 2001/0009* (2013.01); *H02M 2001/0058* (2013.01)

(58) Field of Classification Search
CPC ......... H02M 3/33507; H02M 3/33592; H02M 2001/0058; H02M 2001/0009; H02M 2007/4815; H02M 2007/4818; H02M 1/4241; H02M 3/33523; Y02B 70/1491; Y02B 70/1433; Y02B 70/16
USPC .... 363/15–17, 20–21.02, 40, 41, 59, 60, 98, 363/120, 132
See application file for complete search history.

(56) References Cited

U.S. PATENT DOCUMENTS

| | | | |
|---|---|---|---|
| 2006/0062025 A1 | 3/2006 | Yasumura | |
| 2009/0290389 A1 | 11/2009 | Ueno et al. | |
| 2012/0044722 A1 | 2/2012 | Cuk | |
| 2012/0146530 A1* | 6/2012 | Han | H05B 33/0815 315/219 |
| 2013/0265804 A1* | 10/2013 | Fu | H02M 3/33576 363/17 |
| 2013/0301308 A1 | 11/2013 | Hosotani | |
| 2014/0225439 A1 | 8/2014 | Mao | |
| 2014/0254203 A1* | 9/2014 | Dai | H02M 3/3353 363/17 |
| 2014/0268899 A1* | 9/2014 | Hosotani | H02M 3/33569 363/17 |
| 2015/0049516 A1* | 2/2015 | Yan | H02M 3/33507 363/17 |
| 2015/0131329 A1 | 5/2015 | Chen et al. | |
| 2015/0194811 A1* | 7/2015 | Mao | H02J 7/025 307/104 |
| 2016/0261195 A1* | 9/2016 | Yamaoka | H02M 3/33507 |
| 2017/0331379 A1* | 11/2017 | Mao | H02M 3/3376 |

FOREIGN PATENT DOCUMENTS

| | | |
|---|---|---|
| JP | 2014-217196 A | 11/2014 |
| WO | 2014/174809 A1 | 10/2014 |

OTHER PUBLICATIONS

Final Office Action issued in U.S. Appl. No. 15/016,374, dated Jun. 30, 2017.
Non-Final Office Action issued in U.S. Appl. No. 15/016,374, dated Oct. 19, 2017.
Final Office Action issued in U.S. Appl. No. 15/016,374, dated Mar. 9, 2018.

* cited by examiner

RESONANT POWER CONVERTER

BACKGROUND

1. Technical Field

The present disclosure relates to an electric power conversion device (e.g., a switching power supply device) used for electric power conversion and the like.

2. Description of the Related Art

In a conventional technique for providing a resonant circuit and controlling output electric power in a switching power supply, a resonant capacitor and a resonant inductor are serially connected at one end of a winding of a transformer, for example, as described in Japanese Unexamined Patent Application Publication No. 2014-217196.

The conventional technique has a problem that the resonant circuit becomes large.

SUMMARY

In one general aspect, the techniques disclosed here feature an electric power conversion device including: a transformer including a first winding and a second winding that is magnetically coupled with the first winding; a bridge circuit including a switch element; a rectifier circuit coupled to an output side of the transformer; a first resonant inductor external to the transformer; a second resonant inductor external to the transformer; and a resonant capacitor, wherein one of output terminals of the bridge circuit is connected to a first connection point, and another one of the output terminals of the bridge circuit is connected to a second connection point, one of input terminals of the bridge circuit is connected to a third connection point, and another one of the input terminals of the bridge circuit is connected to a fourth connection point, the first winding is connected to the first connection point and the second connection point, a direct-current voltage that is input between the third connection point and the fourth connection point is converted into an alternating-current voltage by an on/off operation of the switch element of the bridge circuit, the alternating-current voltage is supplied to the first winding, which induces an output voltage in the second winding, the output voltage is supplied to an output terminal, $n1 \geq n2$ is satisfied where $n1$ is the number of turns of the first winding and $n2$ is the number of turns of the second winding, the first resonant inductor is inserted into a pathway from the first connection point to the second connection point via the first winding and is in series with the first winding, the resonant capacitor is inserted into a pathway from the second winding to the rectifier circuit and is in series with the second winding, $Cr > C1$ is satisfied where $Cr$ is a capacitance of the resonant capacitor and $C1$ is a capacitance of a capacitance component that is in series with the first winding in the pathway from the first connection point to the second connection point via the first winding, the second resonant inductor is directly coupled to the second winding, and $Lr > L2$ is satisfied where $Lr$ is an inductance value of the first resonant inductor and $L2$ is an inductance value including an inductance value of the second resonant inductor and an inductance value of a parasitic inductance component that is in series with the second winding in the pathway from the second winding to the rectifier circuit.

According to the present disclosure, it is possible to reduce the size of a resonant circuit.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present invention are described below with reference to the drawings.

First, points on which the inventor of the present invention focused are described.

In the switching power supply device of Japanese Unexamined Patent Application Publication No. 2014-217196, a resonant capacitor and a resonant inductor are serially connected at one end of a winding of a transformer. Therefore, there is a problem that it is difficult to reduce the size of the resonant circuit in accordance with application of the switching power supply device, for example, the driving frequency or input/output voltage of the switching circuit.

Meanwhile, according to the present disclosure, the size of the resonant circuit can be reduced by using a function of impedance conversion of a transformer in accordance with application of the switching power supply device, for example, the driving frequency or input/output voltage of the switching circuit.

Embodiment 1

Figure 1:
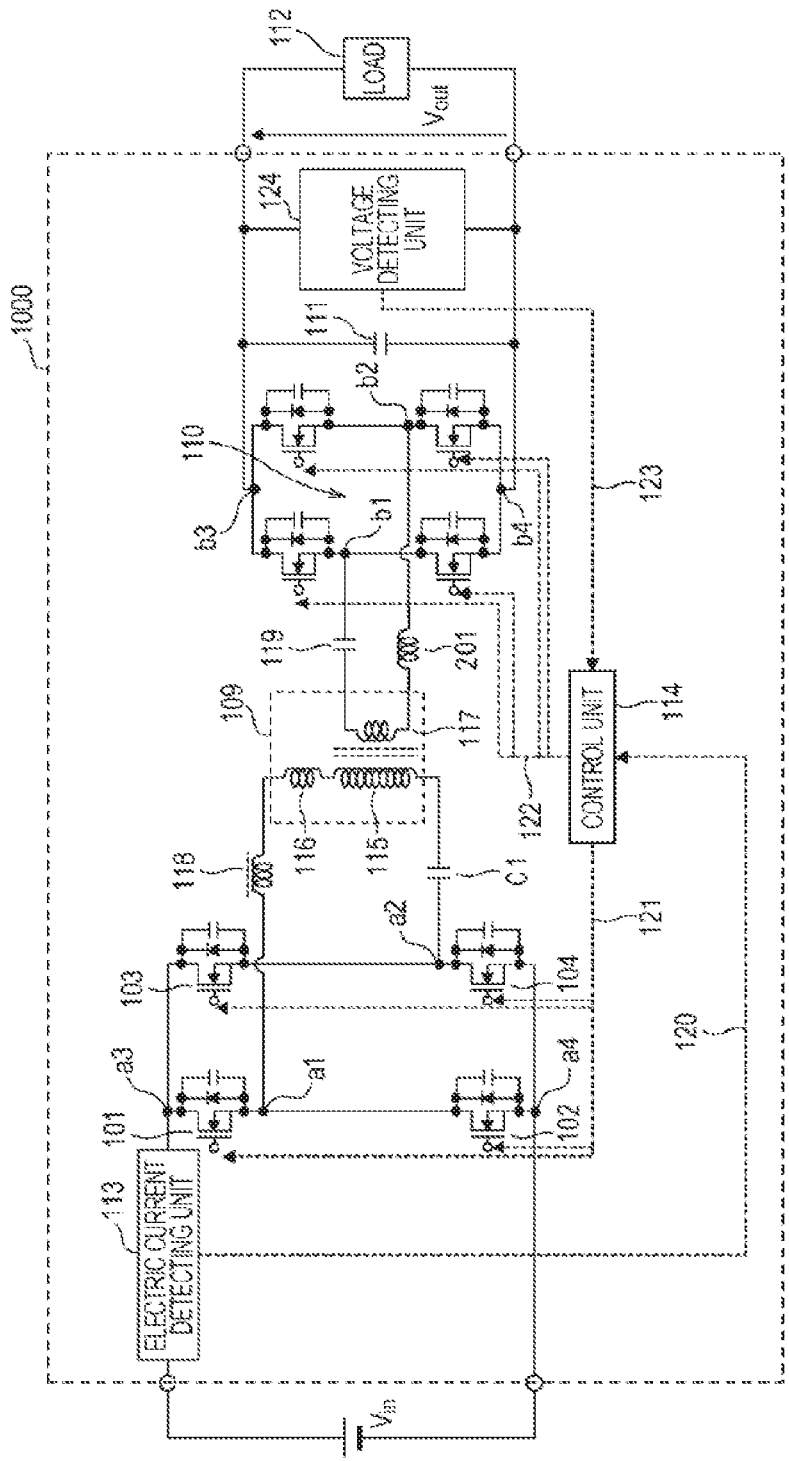
FIG. 1 is a circuit diagram illustrating an outline configuration of an electric power conversion device according to Embodiment 1.

FIG. 1 is a circuit diagram illustrating an outline configuration of an electric power conversion device 1000 according to Embodiment 1.

The electric power conversion device 1000 according to Embodiment 1 includes a transformer 109, a bridge circuit, a resonant inductor 118 (e.g., a first resonant inductor), and a resonant capacitor 119.

The transformer 109 includes a first winding and a second winding that is magnetically coupled with the first winding.

The bridge circuit includes a switch element. One of output terminals of the bridge circuit is connected to a first connection point. The other one of the output terminals of the bridge circuit is connected to a second connection point. One of input terminals of the bridge circuit is connected to a third connection point. The other one of the input terminals of the bridge circuit is connected to a fourth connection point.

In the exemplary configuration illustrated in FIG. 1, the bridge circuit includes a first switch element 101, a second switch element 102, a third switch element 103, and a fourth switch element 104.

In this exemplary configuration, a second terminal (e.g., a source terminal) of the first switch element 101 and a first terminal (e.g., a drain terminal) of the second switch element 102 are connected at a first connection point a1.

In this exemplary configuration, a second terminal (e.g., a source terminal) of the third switch element 103 and a first terminal (e.g., a drain terminal) of the fourth switch element 104 are connected at a second connection point a2.

In this exemplary configuration, a first terminal (e.g., a drain terminal) of the first switch element 101 and a first terminal (e.g., a drain terminal) of the third switch element 103 are connected at a third connection point a3.

In this exemplary configuration, a second terminal (e.g., a source terminal) of the second switch element 102 and a second terminal (e.g., a source terminal) of the fourth switch element 104 are connected at a fourth connection point a4.

The first winding is connected to the first connection point a1 and the second connection point a2.

A direct-current voltage that is input between the third connection point and the fourth connection point is converted into an alternating-current voltage by an on/off operation of the switch element of the bridge circuit. The alternating-current voltage is supplied to the first winding. This induces an output voltage in the second winding. The output voltage is supplied to the output terminals. In the exemplary configuration illustrated in FIG. 1, b1 and b2 are provided as these output terminals.

The direct-current voltage that is input between the third connection point and the fourth connection point may be an input voltage from a direct-current power supply. Alternatively, the direct-current voltage may be an input voltage from an AC/DC circuit, a DC/DC circuit, or the like.

Each of the first through fourth switch elements 101, 102, 103, and 104 that constitute the bridge circuit may be a MOSFET (field-effect transistor). Alternatively, a switch element (e.g., a three-terminal switch element) having a form different from a MOSFET may be used as the switch element.

In the exemplary configuration illustrated in FIG. 1, the electric power conversion device 1000 according to Embodiment 1 further includes an electric current detecting unit 113, a voltage detecting unit 124, a control unit 114, and a rectifier circuit 110.

The control unit 114 may generate a driving voltage 121 and a driving voltage 122 on the basis of a detection signal 120 from the electric current detecting unit 113 and a detection signal 123 from the voltage detecting unit 124. Note that the control unit 114 may be constituted, for example, by a processor (e.g., a CPU (Central Processing Unit), an MPU (Micro-Processing Unit), or the like) and a memory. In this case, the processor may execute a control method of the present disclosure by reading out and executing a program stored in the memory.

ON/OFF of each primary-side switch element is controlled by the driving voltage 121 from the control unit 114.

The rectifier circuit 110 rectifies switching output of the transformer 109, and the rectified output is smoothed by a smoothing capacitor 111. Each switch element that constitutes the rectifier circuit 110 is a MOSFET, and ON/OFF thereof is controlled by the driving voltage 122. Note that a three-terminal switch element, which is a switch element having a form different from the MOSFET, may be used or a diode may be used. Note that in a case where a diode is used in the rectifier circuit 110, the driving voltage 122 becomes unnecessary, and therefore the control unit 114 can be simplified.

The resonant inductor 118 and the resonant capacitor 119 constitute a resonant circuit together with an inductance of the first winding. Note that for simplification of illustration of the circuit diagram, the transformer 109 is illustrated so that a leakage inductance 116 and a first winding 115 of an ideal transformer are separated.

The switching frequencies of the first through fourth switch elements 101, 102, 103, and 104 are controlled between (i) a resonant frequency that is determined on the basis of a resonant inductance value Lr (H), which is an inductance value including inductance values of the leakage inductance 116 of the transformer 109 and the external resonant inductor 118, and a capacitance value Cr (F) of the resonant capacitor 119 and (ii) a resonant frequency that is determined on the basis of Lr and Cr and inductance values Lm (H) of the first winding of the transformer 109. This makes it possible to stabilize an output voltage of the electric power conversion device 1000 (e.g., a switching power supply device).

The number of turns of the first winding is n1. The number of turns of the second winding is n2.

In the electric power conversion device 1000 according to Embodiment 1, n1≥n2. This makes it possible to generate an output voltage that is lower than an input voltage. Here, the electric power conversion device according to this Embodiment can also generate an output voltage that is higher than an input voltage.

In the electric power conversion device 1000 according to Embodiment 1, the resonant capacitor 119 is inserted into a pathway from the second winding to the output terminals so as to be in series with the second winding.

According to the configuration, a resonant capacitor is connected to a second winding side whose number of turns is smaller. This produces the following effects.

Figure 2:
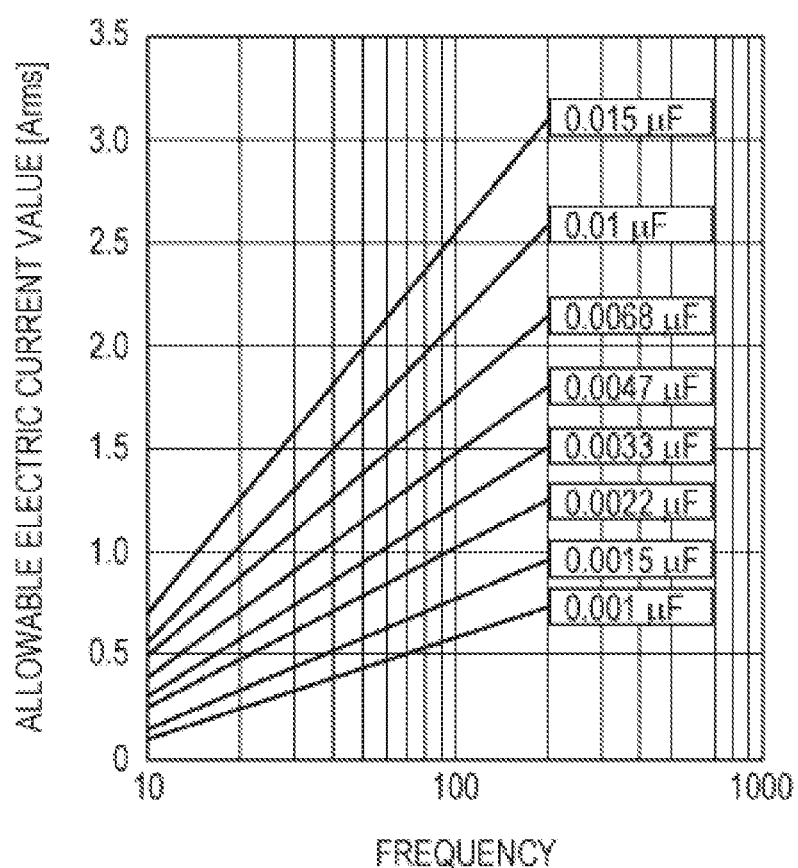
FIG. 2 is a diagram illustrating a relationship between an allowable electric current, a frequency, and a capacitance value of a resonant capacitor.

That is, considering a resonant capacitor Cr in a case where a switching frequency is increased for the purpose of reducing the size of an electric power conversion device, a capacitance value of the capacitor decreases due to the increase of the frequency. This is advantageous to a reduction of the size of the capacitor. Meanwhile, parallel connection of capacitors is needed in order to earn a necessary amount of electric current, as is clear from a relationship between an allowable electric current value and a capacitance value of a capacitor illustrated in FIG. 2. Meanwhile, in order to achieve a small capacitance value which is needed to obtain a high resonant frequency, serial connection of the capacitors is needed to reduce the capacitance value increased due to the parallel connection. This causes a problem that the volume of the whole resonant capacitor becomes large. This is a problem that occurs because a gap between a capacitance value needed for high resonant frequency and a capacitance value needed to earn an allowable electric current becomes larger as the resonant frequency increases.

In view of this, in Embodiment 1, a resonant capacitor is connected to a second winding of a transformer and constitutes a resonant circuit.

An impedance Z1 of the transformer on the first winding side and an impedance Z2 of the transformer on the second winding side have a relationship expressed by the following formula (1):

$$Z_2 = \left(\frac{n_2}{n_1}\right)^2 \cdot Z_1 \quad (1)$$

Since the winding ratio of the transformer is n1≥n2, a relationship expressed by the following formula (2) is established:

$$Z_2 \leq Z_1 \quad (2)$$

An impedance Zc of the capacitor is expressed by the following formula (3):

$$|Z_C| = \frac{1}{\omega C} \quad (3)$$

That is, in the electric power conversion device 1000 according to Embodiment 1, a capacitance value needed to obtain a high resonant frequency can be made larger as compared with a case where the resonant capacitor is connected to a first winding side whose number of turns is larger. This makes it possible to reduce a gap between a capacitance value needed for high resonant frequency and a capacitance value needed to earn an allowable electric current. It is therefore possible to, for example, reduce the number of serial connections of capacitors for reducing a capacitance value increased due to parallel connection. Consequently, the volume of the whole resonant capacitor can be reduced even in high-frequency application.

Furthermore, in the electric power conversion device 1000 according to Embodiment 1, the resonant inductor 118 is inserted into a pathway from the first connection point a1 to the second connection point a2 via the first winding so as to be in series with the first winding.

According to the configuration, it is possible to obtain a stable inductance value.

Meanwhile, in a case where a resonant inductor is connected to a secondary side for high-frequency application, an inductance value needed for resonance can be reduced as expressed by the following formula (4):

$$|Z_L| = \omega L \quad (4)$$

However, in the case where a resonant inductor is connected to a secondary side in high-frequency application, an inductance value becomes too small. This causes a problem that it is difficult to obtain a stable inductance value. Therefore, the configuration in which a resonant inductor is connected to a first winding side is suitable in Embodiment 1.

Assume that the capacitance of the resonant capacitor 119 is Cr.

Furthermore, assume that the capacitance of a capacitance component that is in series with the first winding in the pathway from the first connection point to the second connection point via the first winding is C1. The capacitance component may be an external capacitor element. Alternatively, the capacitance component may be a parasitic capacitance component of the circuit.

In this case, in the electric power conversion device 1000 according to Embodiment 1, Cr>C1.

According to the configuration, even in a case where a parasitic capacitance component exists as C1, it is possible to suppress an influence on a resonant frequency that determines an output voltage.

Assume that an inductance value of the resonant inductor 118 is Lr.

Furthermore, assume that an inductance value of an inductance component that is in series with the second winding in the pathway from the second winding to the output terminals is L2. The inductance component may be an external inductance element. Alternatively, the inductance component may be a parasitic inductance component of the circuit. Alternatively, L2 is an inductance value including an inductance value of the second resonant inductor 201 and an inductance value of a parasitic inductance component that is in series with the second winding in the pathway from the second winding to the rectifier circuit. Here, the second resonant inductor 201 is external to the transformer and directly coupled to the second winding.

In this case, in the electric power conversion device 1000 according to Embodiment 1, Lr>L2.

According to the configuration, even in a case where a parasitic inductance component exists as L2, it is possible to suppress an influence on a resonant frequency that determines an output voltage.

Note that in the electric power conversion device 1000 according to Embodiment 1, the resonant inductor 118 may be constituted by the leakage inductance of the transformer 109.

According to the configuration, an external resonant inductance becomes unnecessary. It is therefore possible to further reduce the size of a resonant circuit portion.

Note that the bridge circuit may be a half bridge circuit.

Figure 3:
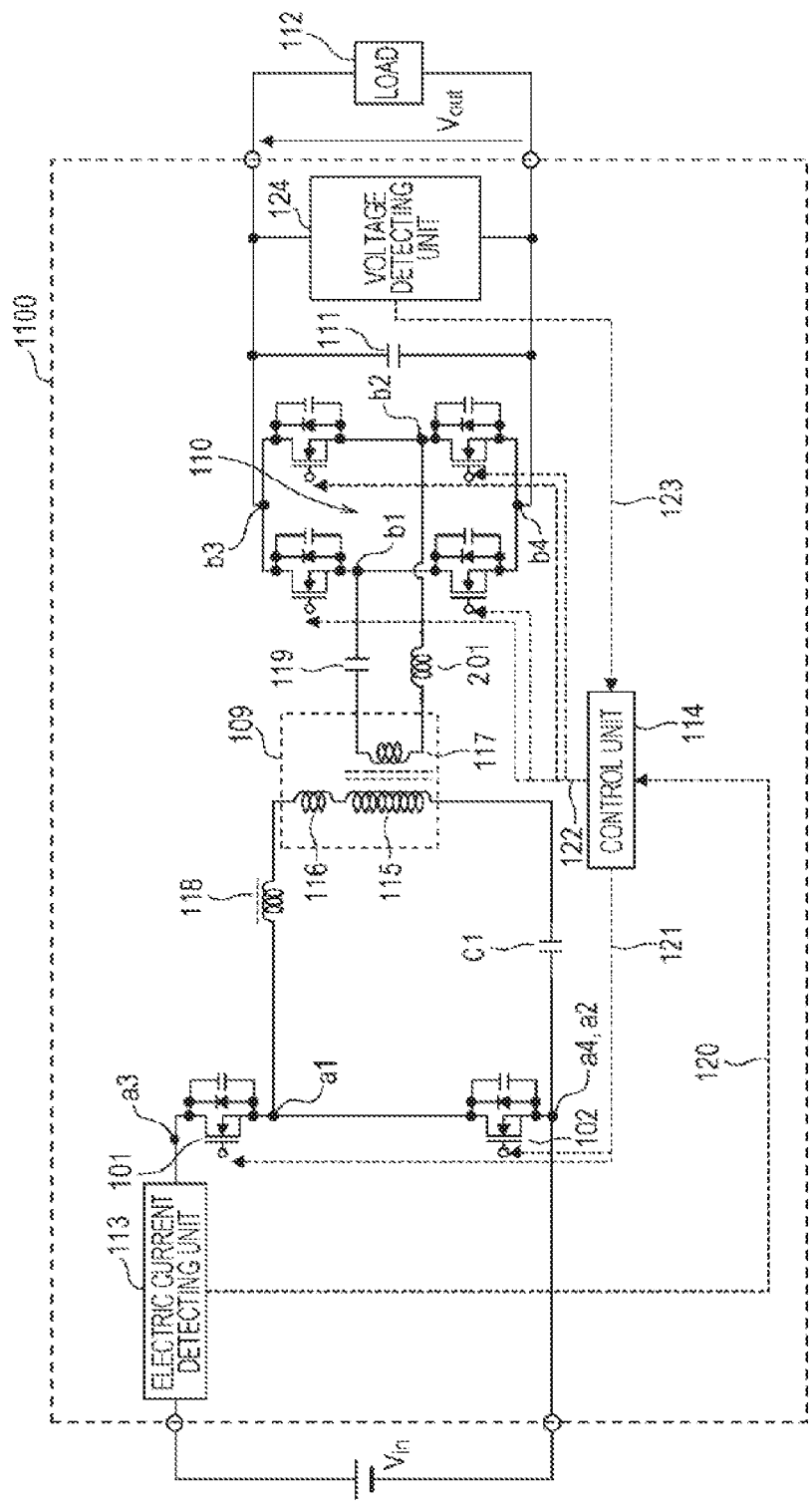
FIG. 3 is a circuit diagram illustrating an outline configuration of an electric power conversion device according to Embodiment 1.

FIG. 3 is a circuit diagram illustrating an outline configuration of an electric power conversion device 1100 according to Embodiment 1.

In the exemplary configuration illustrated in FIG. 3, a bridge circuit includes a first switch element 101 and a second switch element 102.

In this exemplary configuration, a second terminal (e.g., a source terminal) of the first switch element 101 and a first terminal (e.g., a drain terminal) of the second switch element 102 are connected at a first connection point a1.

In this exemplary configuration, a first terminal (e.g., a drain terminal) of the first switch element 101 is connected to a third connection point a3.

In this exemplary configuration, a second terminal (e.g., a source terminal) of the second switch element 102 is connected to the fourth connection point a4.

In this exemplary configuration, a second connection point a2 is connected to the fourth connection point a4. Note that the second connection point a2 and the fourth connection point a4 may be the same connection point as illustrated in FIG. 3.

Embodiment 2

Embodiment 2 is described below. Note that detailed description of parts identical to those in Embodiment 1 is omitted as appropriate.

Figure 4:
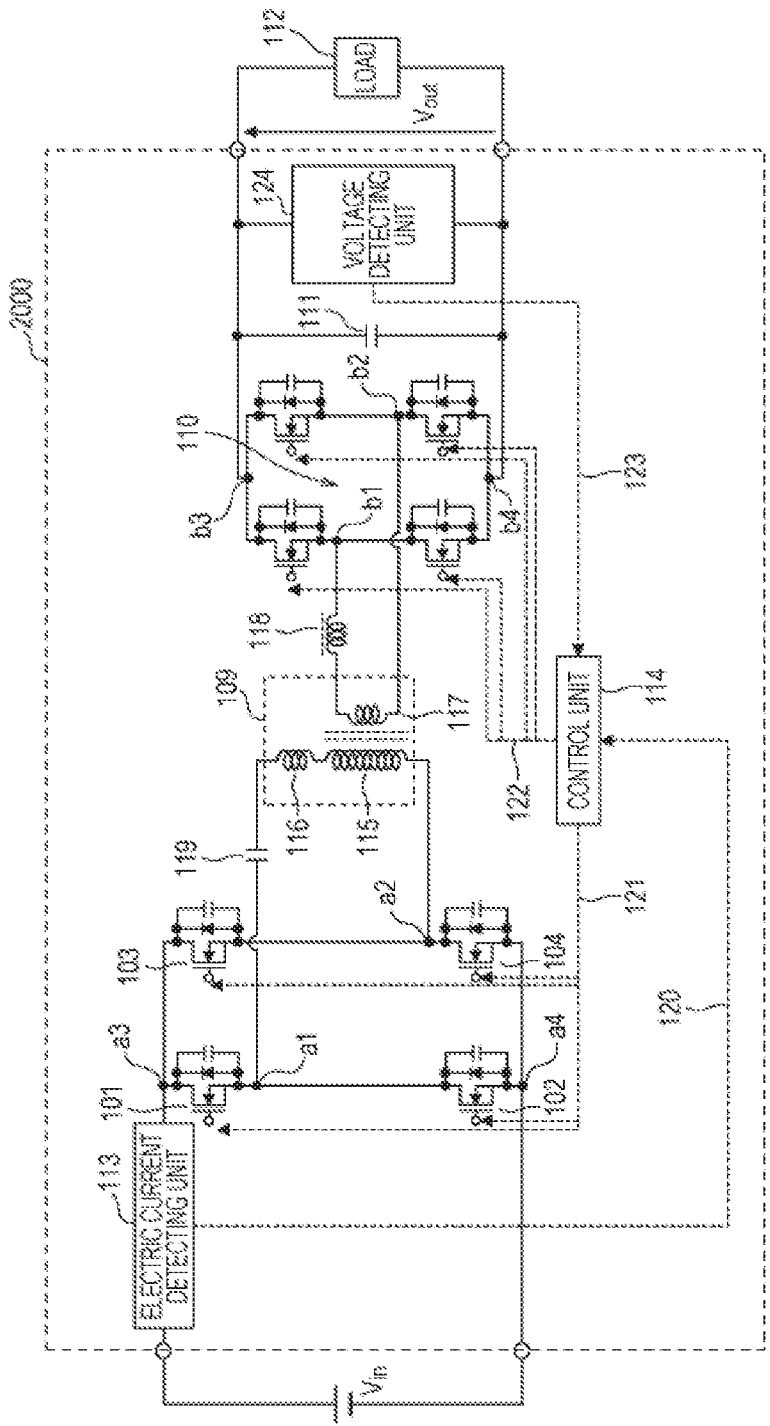
FIG. 4 is a circuit diagram illustrating an outline configuration of an electric power conversion device according to Embodiment 2.

FIG. 4 is a circuit diagram illustrating an outline configuration of an electric power conversion device 2000 according to Embodiment 2.

The number of turns of a first winding is n1. The number of turns of a second winding is n2.

In the electric power conversion device 2000 according to Embodiment 2, n1≥n2. This makes it possible to generate an output voltage that is lower than an input voltage. Here, the electric power conversion device according to this Embodiment can also generate an output voltage that is higher than an input voltage.

Embodiment 2 is different from Embodiment 1 as follows.

In the electric power conversion device 2000 according to Embodiment 2, a resonant inductor 118 is inserted into a pathway from the second winding to output terminals so as to be in series with the second winding.

According to the configuration, a resonant inductor is connected to a second winding side whose number of turns is smaller. This produces the following effects.

That is, considering a resonant inductor Lr in a case where a switching frequency is made low, for example, for the purpose of reducing loss in an electric power conversion device, an inductance value increases due to the decrease of the frequency. This causes a problem that the volume of the resonant inductor becomes large.

In view of this, in Embodiment 2, a resonant inductor is connected to a second winding of a transformer and constitutes a resonant circuit.

Since the winding ratio of the transformer is n1≥n2, Z2≤Z1 is established on the basis of the formula (2) described above.

An impedance ZL of the inductor is expressed by the formula (4) described above.

Therefore, in the case where a resonant inductor is connected to a second winding side whose number of turns is smaller, an inductance value needed to obtain a low resonant frequency can be made smaller as compared with a case where a resonant inductor is connected to a first winding side whose number of turns is larger. This makes it possible to reduce the volume of the resonant inductor even in low-frequency application.

In the electric power conversion device 2000 according to Embodiment 2, a resonant capacitor 119 is inserted into a pathway from a first connection point a1 to a second connection point a2 via the first winding so as to be in series with the first winding.

According to the configuration, it is possible to suppress an increase in the size of a resonant circuit portion.

Meanwhile, in a case where a resonant capacitor is connected to a secondary side in low-frequency application, a capacitor value needed for resonance becomes too large as expressed by the formula (3) described above. This causes a problem that the size of the resonant circuit portion becomes large. Therefore, the configuration in which a resonant capacitor is connected to a first winding side is suitable in Embodiment 2.

Assume that an inductance value of the resonant inductor 118 is Lr.

Furthermore, assume that an inductance value of an inductance component that is in series with the first winding in the pathway from the first connection point a1 to the second connection point a2 via the first winding is L1. The inductance component may be an external inductance element. Alternatively, the inductance component may be a parasitic inductance component of the circuit.

In this case, in the electric power conversion device 2000 according to Embodiment 2, Lr>L1.

According to the configuration, even in a case where a parasitic inductance component exists as L1, it is possible to suppress an influence on a resonant frequency that determines an output voltage.

Assume that the capacitance of the resonant capacitor 119 is Cr.

Furthermore, assume that the capacitance of a capacitance component that is in series with the second winding in the pathway from the second winding to the output terminals is C2. In this case, the capacitance component may be an external capacitor element. Alternatively, the capacitance component may be a parasitic capacitance component of the circuit.

In this case, in the electric power conversion device 2000 according to Embodiment 2, Cr>C2.

According to the configuration, even in a case where a parasitic capacitance component exists as C2, it is possible to suppress an influence on a resonant frequency that determines an output voltage.

Embodiment 3

Embodiment 3 is described below. Note that detailed description of parts identical to those in Embodiment 1 is omitted as appropriate.

Figure 5:
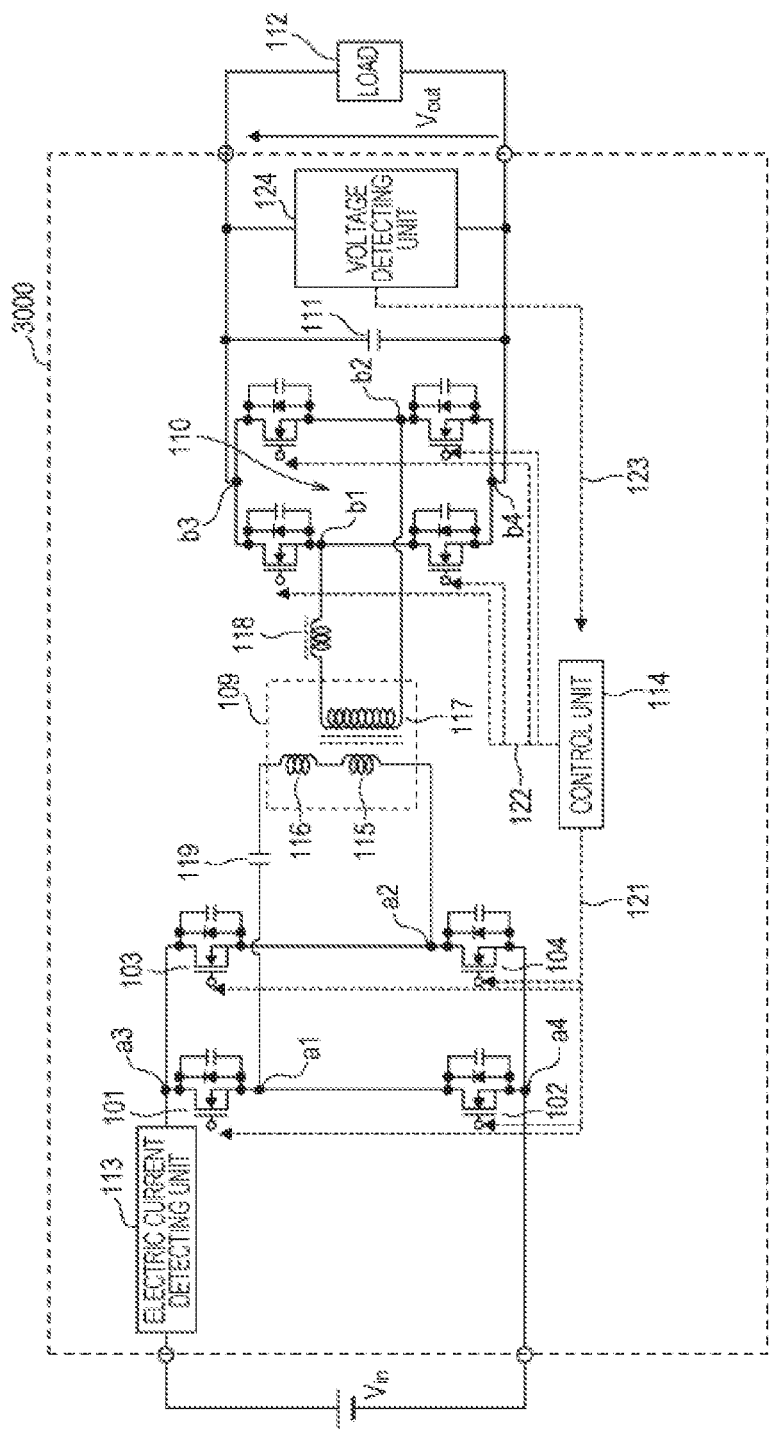
FIG. 5 is a circuit diagram illustrating an outline configuration of an electric power conversion device according to Embodiment 3.

FIG. 5 is a circuit diagram illustrating an outline configuration of an electric power conversion device 3000 according to Embodiment 3.

Embodiment 3 is different from Embodiment 1 as follows.

The number of turns of a first winding is n1. The number of turns of a second winding is n2.

In the electric power conversion device 3000 according to Embodiment 3, n1<n2. This makes it possible to generate an output voltage that is higher than an input voltage.

In the electric power conversion device 3000 according to Embodiment 3, a resonant capacitor 119 is inserted into a pathway from a first connection point a1 to a second connection point a2 via the first winding so as to be in series with the first winding.

According to the configuration, a resonant capacitor is connected to a first winding side whose number of turns is smaller. This produces the following effects.

That is, considering a resonant capacitor Cr in high-switching-frequency application, a gap between a capacitance value needed for resonance and a capacitance value needed to earn an allowable electric current becomes larger as the frequency increases. This causes a problem that the volume of the whole resonant capacitor becomes large.

In view of this, in the electric power conversion device 3000 according to Embodiment 3, the resonant capacitor 119 is connected to the first winding of a transformer 109 and constitutes a resonant circuit.

Since the winding ratio of the transformer is n1<n2, the relationship expressed by the following formula (5) is obtained:

$$Z_1 < Z_2 \quad (5)$$

An impedance Zc of the capacitor is expressed by the formula (3) described above.

Therefore, in the case where a resonant capacitor is connected to a first winding side whose number of turns is smaller, a capacitance value needed to obtain a high resonant frequency can be made larger as compared with a case where a resonant capacitor is connected to a second winding side whose number of turns is larger. This makes it possible to reduce a gap between a capacitance value needed for resonance and a capacitance value needed to earn an allowable electric current. It is therefore possible to reduce the volume of the whole resonant capacitor even in high-frequency application.

In the electric power conversion device 3000 according to Embodiment 3, a resonant inductor 118 inserted into a pathway from the second winding to output terminals so as to be in series with the second winding.

According to the configuration, it is possible to obtain a stable inductance value.

Meanwhile, in a case where a resonant inductor is connected to a primary side in high-frequency application, an inductance value needed for resonance can be made small as expressed by the formula (4) described above.

However, in the case where a resonant inductor is connected to a primary side in high-frequency application, the inductance value becomes too small. This causes a problem that it is difficult to obtain a stable inductance value. Therefore, the configuration in which a resonant inductor is connected to a second winding side is suitable in Embodiment 3.

Assume that the capacitance of the resonant capacitor 119 is Cr.

Furthermore, assume that the capacitance of a capacitance component that is in series with the second winding in the pathway from the second winding to the output terminals is C2.

In this case, in the electric power conversion device 3000 according to Embodiment 3, Cr>C2.

According to the configuration, even in a case where a parasitic capacitance component exists as C2, it is possible to suppress an influence on a resonant frequency that determines an output voltage.

Assume that an inductance value of the resonant inductor 118 is Lr.

Furthermore, assume that an inductance value of an inductance component that is in series with the first winding in the pathway from the first connection point a1 to the second connection point a2 via the first winding is L1.

In this case, in the electric power conversion device 3000 according to Embodiment 3, Lr>L1.

According to the configuration, even in a case where a parasitic inductance component exists as L1, it is possible to suppress an influence on a resonant frequency that determines an output voltage.

Note that in the electric power conversion device 3000 according to Embodiment 3, the resonant inductor 118 may be constituted by a leakage inductance of the transformer 109.

According to the configuration, an external resonant inductance becomes unnecessary. It is therefore possible to further reduce the size of a resonant circuit portion.

Embodiment 4

Embodiment 4 is described below. Note that detailed description of parts identical to those in Embodiment 1 is omitted as appropriate.

Figure 6:
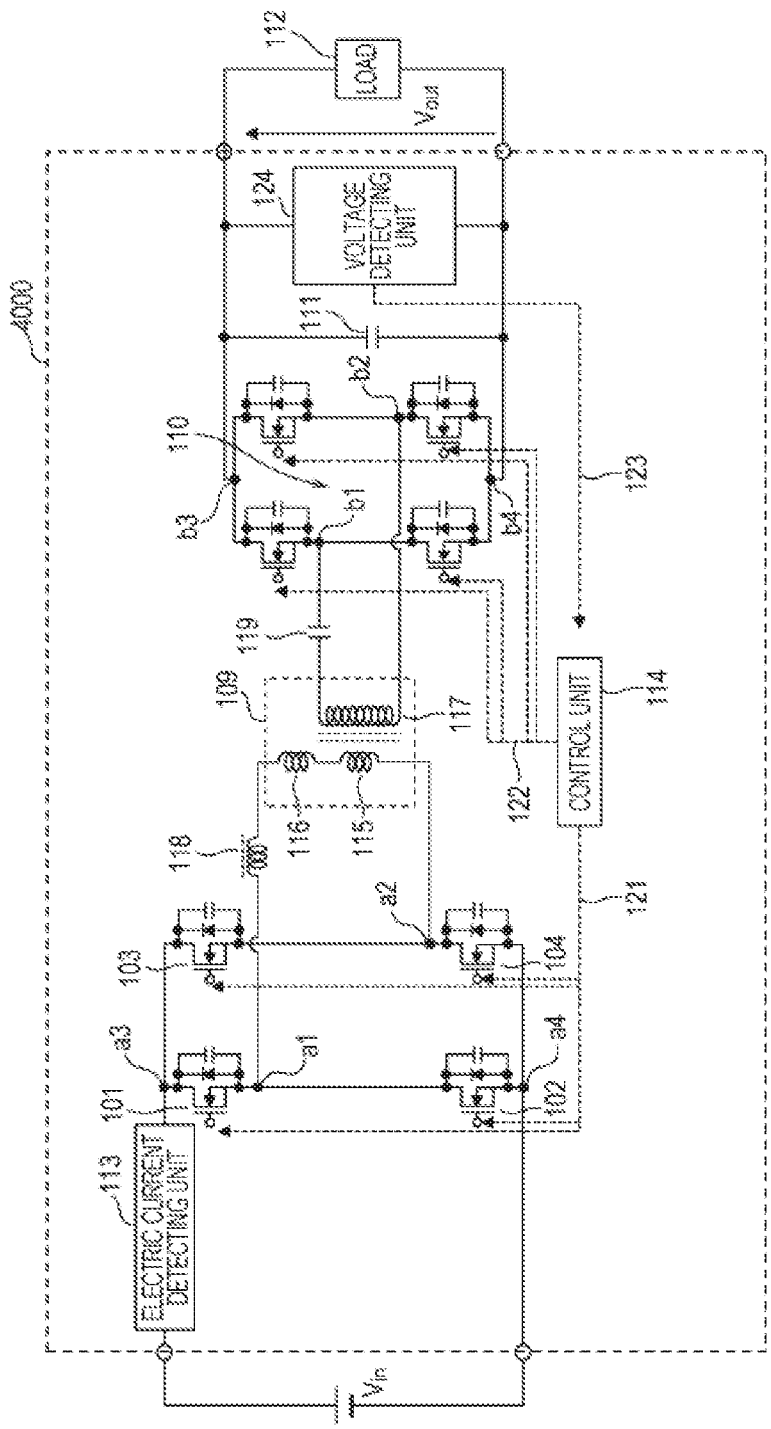
FIG. 6 is a circuit diagram illustrating an outline configuration of an electric power conversion device according to Embodiment 4.

FIG. 6 is a circuit diagram illustrating an outline configuration of an electric power conversion device 4000 according to Embodiment 4.

Embodiment 4 is different from Embodiment 1 as follows.

The number of turns of a first winding is n1. The number of turns of a second winding is n2.

In the electric power conversion device 4000 according to Embodiment 4, n1<n2. This makes it possible to generate an output voltage that is higher than an input voltage.

In the electric power conversion device 4000 according to Embodiment 4, a resonant inductor 118 is inserted into a pathway from a first connection point a1 to a second connection point a2 via the first winding so as to be in series with the first winding.

According to the configuration, a resonant inductor is connected to a first winding side whose number of turns is smaller. This produces the following effects.

That is, considering a resonant inductor Lr in low-switching-frequency application, a needed inductance value increases as the frequency decreases. This causes a problem that the volume of the whole resonant inductor becomes large.

In view of this, in the electric power conversion device 4000 according to Embodiment 4, the resonant inductor 118 is connected to the first winding of a transformer 109 and constitutes a resonant circuit.

Since the winding ratio of the transformer is n1<n2, Z1<Z2 is established on the basis of the formula (5) described above.

An impedance ZL of the inductor is expressed by the formula (4) described above.

Therefore, in the case where a resonant inductor is connected to a first winding side whose number of turns is smaller, an inductance value needed to obtain a low resonant frequency can be made smaller as compared with a case where a resonant inductor is connected to a second winding side whose number of turns is larger. This makes it possible to reduce the volume of the resonant inductor even in low-frequency application.

In the electric power conversion device 4000 according to Embodiment 4, a resonant capacitor 119 is inserted into a pathway from the second winding to output terminals so as to be in series with the second winding.

According to the configuration, it is possible to suppress an increase in the size of a resonant circuit portion.

Meanwhile, in a case where a resonant capacitor is connected to a primary side in low-frequency application, a capacitor value needed for resonance becomes too large as expressed by the formula (3) described above. This causes a problem that the size of the resonant circuit portion becomes large. Therefore, the configuration in which a resonant capacitor is connected to a second winding side is suitable in Embodiment 4.

Assume that an inductance value of the resonant inductor 118 is Lr.

Furthermore, assume that an inductance value of an inductance component that is in series with the second winding in the pathway from the second winding to the output terminals is L2.

In this case, in the electric power conversion device 4000 according to Embodiment 4, Lr>L2.

According to the configuration, even in a case where a parasitic inductance component exists as L2, it is possible to suppress an influence on a resonant frequency that determines an output voltage.

Assume that the capacitance of the resonant capacitor 119 is Cr.

Furthermore, assume that the capacitance of a capacitance component that is in series with the first winding in the pathway from the first connection point to the second connection point via the first winding is C1.

In this case, in the electric power conversion device 4000 according to Embodiment 4, Cr>C1.

According to the configuration, even in a case where a parasitic capacitance component exists as C1, it is possible to suppress an influence on a resonant frequency that determines an output voltage.

Note that each of the electric power conversion devices according to Embodiments 1 through 4 may be an electric power conversion device that performs unidirectional electric power conversion from a direct-current voltage Vin toward a load. Alternatively, each of the electric power conversion devices according to Embodiments 1 through 4 may be an electric power conversion device that performs bidirectional electric power conversion. Note that bidirectional electric power conversion can be achieved, for example, by using a switch element in a rectifier circuit portion.

The present disclosure is suitable applicable to various switching power supply devices such as an on-board power-supply apparatus and a power conditioner that are required to have a small size, high output, and high efficiency.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. An electric power conversion device comprising:
a transformer including a first winding and a second winding that is magnetically coupled with the first winding;
a bridge circuit including a switch element;
a rectifier circuit coupled to an output side of the transformer;
a first resonant inductor external to the transformer;
a second resonant inductor external to the transformer; and
a resonant capacitor, wherein
one of output terminals of the bridge circuit is connected to a first connection point, and another one of the output terminals of the bridge circuit is connected to a second connection point,
one of input terminals of the bridge circuit is connected to a third connection point, and another one of the input terminals of the bridge circuit is connected to a fourth connection point,
the first winding is connected to the first connection point and the second connection point,
a direct-current voltage that is input between the third connection point and the fourth connection point is converted into an alternating-current voltage by an on/off operation of the switch element of the bridge circuit,
the alternating-current voltage is supplied to the first winding, which induces an output voltage in the second winding,
the output voltage is supplied to an output terminal,
$n1 \geq n2$ is satisfied where n1 is the number of turns of the first winding and n2 is the number of turns of the second winding,
the first resonant inductor is inserted into a pathway from the first connection point to the second connection point via the first winding and is in series with the first winding,
the resonant capacitor is inserted into a pathway from the second winding to the rectifier circuit and is in series with the second winding,
$Cr > C1$ is satisfied where Cr is a capacitance of the resonant capacitor and C1 is a capacitance of a capacitance component that is in series with the first winding in the pathway from the first connection point to the second connection point via the first winding,
the second resonant inductor is directly coupled to the second winding, and
$Lr > L2$ is satisfied where Lr is an inductance value of the first resonant inductor and L2 is an inductance value including an inductance value of the second resonant inductor and an inductance value of a parasitic inductance component that is in series with the second winding in the pathway from the second winding to the rectifier circuit.

2. The electric power conversion device according to claim 1, wherein
the bridge circuit includes a first switch element, a second switch element, a third switch element, and a fourth switch element;
a second terminal of the first switch element and a first terminal of the second switch element are connected at the first connection point;
a second terminal of the third switch element and a first terminal of the fourth switch element are connected at the second connection point;
a first terminal of the first switch element and a first terminal of the third switch element are connected at the third connection point; and
a second terminal of the second switch element and a second terminal of the fourth switch element are connected at the fourth connection point.

* * * * *